United States Patent Office 3,390,163
Patented June 25, 1968

3,390,163
OCTAPHENYLTETRACYCLOOCTASILOXANE-
DIOLS AND METHODS FOR PREPARING
THE SAME
John F. Brown, Jr., Schenectady, N.Y., assignor to
General Electric Company, a corporation of New
York
No Drawing. Filed Apr. 5, 1965, Ser. No. 445,772
6 Claims. (Cl. 260—448.2)

ABSTRACT OF THE DISCLOSURE

Octaphenyltetracyclooctasiloxanediols are obtained by hydrolysis of a phenylsilane containing three hydrolyzable groups. The compositions have utility as coating and insulating materials and can be condensed with other hydrolyzable silanes to make copolymeric compositions.

---

This invention is concerned with phenylpolysiloxanols and methods for preparing the same. More particularly, the invention is concerned with octaphenyltetracyclooctasiloxanediols (hereinafter referred to as "siloxanediols") having the following basic structure whose atoms are numbered as follows:

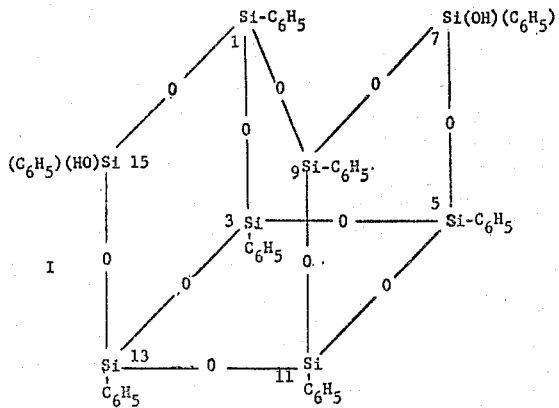

and are specifically selected from the class consisting of (a) exo-exo-octaphenyltetracyclo[7.7.1.1$^{3,13}$.1$^{5,11}$] octasiloxanediol - 7,15; (b) endo-endo-octaphenyltetracyclo-[7.7.1.1$^{3,13}$.1$^{5,11}$]octosiloxanediol - 7,15; (c) endo-exo-octaphenyltetracyclo[7.7.1.1$^{3,13}$.1$^{5,11}$]octasiloxanediol - 7, 15, and mixtures thereof. The compositions of Formula I (which can also be called "epimers") are formed when phenylsilanetriol (or species which can yield it upon hydrolysis, such as phenyltrichlorosilane) undergoes polycondensation in acidic mixtures of water and a polar solvent, such as acetone or diethyl ether. Partial condensation products of phenylsilanetriol, such as the 1,3-diphenyldisiloxanetetrol described by Brown and Slusarczuk in J. Org. Chem., 29, 2809 (1964), or the cis-cis-cis-2,4,6,8 - tetraphenylcyclotetrasiloxanetetrol described in the applicant's pending application, Ser. No. 386,050, filed July 29, 1964, and assigned to the same assignee as the present invention, may also be used as the starting materials for making the siloxanediols. The time required for the condensation depends greatly upon the concentrations employed; thus, a 35 g. per 100 ml. solution of phenyltrichlorosilane in aqueous diethyl ether is sufficiently condensed in 1 to 2 hours at 35° C., whereas a 4 g. per 100 ml. solution of phenyltrichlorosilane in aqueous acetone, or a comparable solution prepared from the above-mentioned cyclotetrasiloxanetetrol and hydrochloric acid, requires 2 to 5 months at 25° C. The yield of siloxanediols obtained, however, is strongly favored by dilution, being of the order of 20% in the 35 g. per 100 ml. system cited above, and 70% in the more dilute systems. When the hydrolysis and condensation is carried out in a non-polar solvent, such as toluene, which is conventionally employed in the manufacture of silicone resins, none of the siloxanediols could be isolated.

The above polycondensations yield various byproducts in addition to the species of Formula I. These include less highly condensed polyols, structural isomers of the siloxanediols of Formula I, octaphenylsilsesquioxane, and higher molecular weight polycondensates. Separation of the mixed epimers of Formula I from the other reaction products is conveniently effected by filtration (which removes the very insoluble octaphenylsilsesquioxane and the structural isomers) followed by fractional precipitation of an acetone solution of the crude reaction product with water. Addition of one volume water per two volumes of acetone precipitates out most of the higher polycondensates, leaving mainly the siloxanediols and polyols in solution. Addition of a second volume of water per two volumes of acetone then precipitates the siloxanediols as a resinous mixture. The progress of siloxanediol concentration may be followed by observing the infrared spectrum of a 0.2 to 2.0% solution of the mixture in carbon disulfide. The siloxanediols of Formula I show a sharp band at 3675 cm.$^{-1}$ having a specific extinction, $$E_{1\ cm.}^{1\%}$$

of 2.6. This band is either absent or weaker in the reaction by-products. The siloxanediols of Formula I show an even more characteristic infrared band near 1082 cm.$^{-1}$; however, the intensity of this band varies slightly from one epimer to another.

The mixtures of the epimeric siloxanediols are initially obtained as non-crystalline compositions, readily soluble in hydrocarbon solvents. However, on long standing in on-polar solvents such as carbon disulfide or cyclohexane, the individual siloxanediols gradually separate as relatively difficultly soluble crystalline solids.

The most insoluble epimer, and the first to separate on crystallization is the exo-exo derivative of Formula I. The second epimer to separate is the exo-endo form. The most soluble and slowly crystallized epimer is the endo-endo form. Further separation and purification can be effected by fractional crystallization. Crystallization from a hot solution in a 1:1 volume mixture of benzene and cyclohexane gives mainly the exo-exo silioxanediol. Crystallization of a mixture from which most of the exo-exo-primer has already been removed from the minimal amount of benzene required for solution at the boiling point gives mainly the exo-endo siloxanediol. Crystallization of the carbon disulfide-soluble residues remaining after the exo-exo and exo-endo forms have been removed by alternating crystallizations under the above conditions from a 1:3 volume mixture of benzene and cyclohexane, gives mainly the endo-endo siloxanediol. The infrared spectra (taken in dilute carbon disulfide solution) of all three epimers are very similar to each other and to the original non-crystalline mixture.

In order that those skilled in the art may better understand how the present invention may be practiced, the following examples are given by way of illustration not by way of limitation.

Example I

About 40 grams phenyltrichlorosilane dissolved in 700 ml. acetone was added with stirring to 250 ml. water at room temperature. After allowing the mixture to stand for 4 months at room temperature, the latter was filtered to remove the deposited solid octaphenylsilsesquioxane. The filtrate was then diluted with 450 ml. water which caused precipitation of 23.5 grams of a mixture of the crude siloxanediols. This mixture was dissolved in 20 ml./g. of carbon disulfide and allowed to stand at 0° C. for about 2 weeks. The first crop of crystals which appeared (the exo-exo epimer) was removed. The solution was then concentrated by removing about 90% of the carbon disulfide by evaporation and allowing the remaining solution to remain at 0° C. The crystals which appeared at this point were a mixture of the exo-exo and endo-exo epimers. These crystals were removed and on further removal of carbon disulfide and cooling, additional amounts of the exo-endo along with the endo-endo epimer were obtained. The various fractions were separated into the pure siloxanediol components by the fractional crystallization procedure outlined above. The following Table I shows the properties of the three epimeric compositions and the analyses on each of the compounds:

TABLE I

| Isomer | Melting Point, °C. | Percent | | | Mol. Wt.[c] |
|---|---|---|---|---|---|
| | | C | H | OH | |
| Exo-exo | 270–272 | 54.7 | 3.9 | [a] 3.3 | 1,070±10% |
| Exo-endo | 177–181 | 55.1 | 4.2 | [a] 3.4 | 1,100±10% |
| Endo-endo | 242–247 | 55.0 | 4.2 | [b] 3.3 | |
| Theoretical analyses for siloxanediol | | 54.9 | 4.0 | 3.24 | 1,050 |

[a] Determined by Zerewitnoff analysis.
[b] Determined by infrared analysis.
[c] Determined by a Mechrolab Osmometer using benzene solutions.

The above siloxanediols have many uses. Because of the multi-functionality as a result of the presence of the silicon-bonded hydroxyl groups, these compositions can be heated, preferably in the presence of dehydrating agents such as ethyl borate or a drier such as metallic salts of organic carboxylic acids (e.g., iron octoate, etc.) at temperatures of about 150–250° C. to effect conversion of the siloxanediol to a highly condensed solid state. Prior to conversion to this state, resins derived from partially condensed siloxanediols can be dissolved in various solvents to form solutions which in turn can be used to coat electrical conductors, and the coated conductor thereafter subjected to temperatures of 150–250° C. to effect conversion of the resin, in the presence of suitable, well-known curing agents, to the cured state to yield insulations on the conductors which are heat-resistant and are resistant to extremes in moisture. Additionally, the aforesaid resin solutions can be used to coat sheet material, such as glass cloth, asbestos cloth, etc., which after superposing piles of these materials, they can be pressed at elevated temperatures and pressures to make heat-resistant, laminated panels.

One important use for the above siloxanediols is as an additive in a silicone rubber of the formula

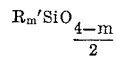

where R' is a monovalent organic radical, e.g., methyl, ethyl, phenyl, vinyl, etc., and $m$ is a number from 1.9 to 2.1, inclusive, to prevent formation of "nerve" or "structure" in the rubber as a result of the presence of a reinforcing filler such as fume silica, precipitated silica, silica aerogel, etc. The use of hydroxyl-containing silanes and polysiloxanes for use in reducing structure in silicone rubber in the presence of a reinforcing filler is more particularly disclosed in U.S. Patent 2,890,188, Konkle et al. For the purpose of reducing structure, one can employ from about 0.1 to 10 percent, by weight, of the epimeric siloxanediols, based on the weight of the silicone gum. The silicone gum used can be, e.g., a polydimethylsiloxane or one containing up to 0.5 mol percent silicon-bonded vinyl groups. The incorporation of the siloxanediol in such filled silicone gums, in addition to improving the strength of the cured product, also results in an improved stability of the filled compound, as contrasted to the attainment, in a matter of a few hours, of a highly structured compound when the siloxanediol is omitted.

The above-described siloxanediols can be interacted with other organosilicon compositions to obtain copolymeric products. Thus, the aforesaid siloxanediols can be reacted with organohalogenosilanes of the formula

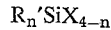

where R' is a monovalent organic radical, X is a halogen, and $n$ is an integer from 1 to 3, inclusive, such as dimethyldichlorosilane, dibutyldibromosilane, ditolyldichlorosilane, methyltrichlorosilane, phenyltrichlorosilane, trimethylchlorosilane, etc., in solvents such as diethyl ether, dioxane, etc., under anhydrous conditions employing a hydrohalide acceptor such as pyridine, triethylamine, etc., to remove the hydrogen halide formed.

Alternatively these siloxanediols (either individually or mixtures thereof) can be reacted with acetoxy chain-stopped polydiorganosiloxanes, for instance, acetoxy chain-stopped polydimethylsiloxanes to effect the formation of intercondensation products, which can then be blended with certain crosslinking agents, such as methyltriacetoxysilane, to give compositions of matter which upon exposure to atmospheric moisture can be converted to tough, elastomeric products.

The following examples illustrate the preparation of coreaction products from the aforesaid siloxanediols.

Example 2

About 105 grams of a mixture of the above-identified three epimeric siloxanediols is heated with 196 grams of an acetoxy chain-stopped polydimethylsiloxane fluid having a mean chain length of 25 dimethylsiloxy units. The heating is conducted at 100° C. at a pressure of 50 mm., until evolution of acetic acid ceases. The resulting gum is then blended with 12 grams of methyltriacetoxysilane to give a composition which upon exposure to atmospheric moisture forms a tough elastomeric product.

Example 3

About 315 grams of the mixture of epimeric siloxanediols described above is reacted with 75 grams of 1,3-diacetoxytetramethyldisiloxane and 22 grams methyltriacetoxysilane in 500 ml. toluene by heating the mixture at the reflux temperature of the mass while at the same time removing 150 ml. of the toluene-acetic acid azeotrope of a distillate. After cooling the reaction mass, the resin solution obtained is stirred with 800 ml. water to complete the hydrolysis of the acetoxy groups, and the bulk of the residual toluene, water and acetic acid are removed under a vacuum of 20 mm. pressure. The remaining resin is used to coat glass cloth, and when this coated cloth is heated at 150–200° C. for about 15 to 30 minutes, a tough, insoluble coating is obtained on the glass cloth.

What I claim as new and desire to secure by Letters Patent of the United States is:

1. A composition of matter selected from the class consisting of (a) exo - exo - octaphenyltetracyclo [7.7.1.1$^{3,13}$.1$^{5,11}$]octasiloxanediol-7,15, (b) endo-exo-octaphenyltetracyclo[7.7.1.1$^{3,13}$.1$^{5,11}$]octasiloxanediol - 7, 15, and (c) endo-endo-octaphenyltetracyclo[7.7.1.1$^{3,13}$.1$^{5,11}$] octasiloxanediol-7,15, and mixtures thereof.

2. Exo - exo - octaphenyltetracyclo[7.7.1.1$^{3,13}$.1$^{5,11}$] octasiloxanediol-7,15.

3. Endo - endo - octaphenyltetracyclo[7.7.1.1$^{3,13}$.1$^{5,11}$] octasiloxanediol-7,15.

4. Endo - exo - octaphenyltetracyclo[7.7.1.1$^{3,13}$.1$^{5,11}$] octasiloxanediol-7,15.

5. The process for making a mixture of isomers selected from the class consisting of (a) exo-exo-octaphenyltetracyclo[7.7.1.1$^{3,13}$.1$^{5,11}$]octasiloxanediol - 7,15, (b) endo - endo - octaphenyltetracyclo[7.7.1.1$^{3,13}$.1$^{5,11}$]octasiloxanediol-7,15 and (c) endo-exo-octaphenyltetracyclo [7.7.1.1$^{3,13}$.1$^{5,11}$]octasiloxanediol-7,15, which comprises hydrolyzing phenyltrichorosilane in a mixture of water and a polar solvent selected from the class consisting of diethyl ether and acetone and allowing the mixture to remain at temperatures of from about 20 to 35° C. for a time sufficient to form the aforesaid isomers.

6. The process as in claim 5 in which the individual isomers are separated.

References Cited

UNITED STATES PATENTS

| 2,465,188 | 3/1949 | Barry, et al. | 260—448.2 |
| 2,832,794 | 4/1958 | Gordon | 260—448.2 |
| 2,842,522 | 7/1958 | Frye | 260—46.5 |
| 3,000,858 | 9/1961 | Brown | 260—46.5 |
| 3,120,500 | 2/1964 | Huntington, et al. | 260—46.5 |
| 3,162,614 | 12/1964 | Katchman | 260—46.5 |

TOBIAS E. LEVOW, *Primary Examiner.*

J. P. PODGORSKI, *Assistant Examiner.*